Feb. 1, 1966   J. C. RYAN   3,233,153
ELECTRICAL CONTROL CIRCUIT
Filed Oct. 26, 1962   3 Sheets-Sheet 1
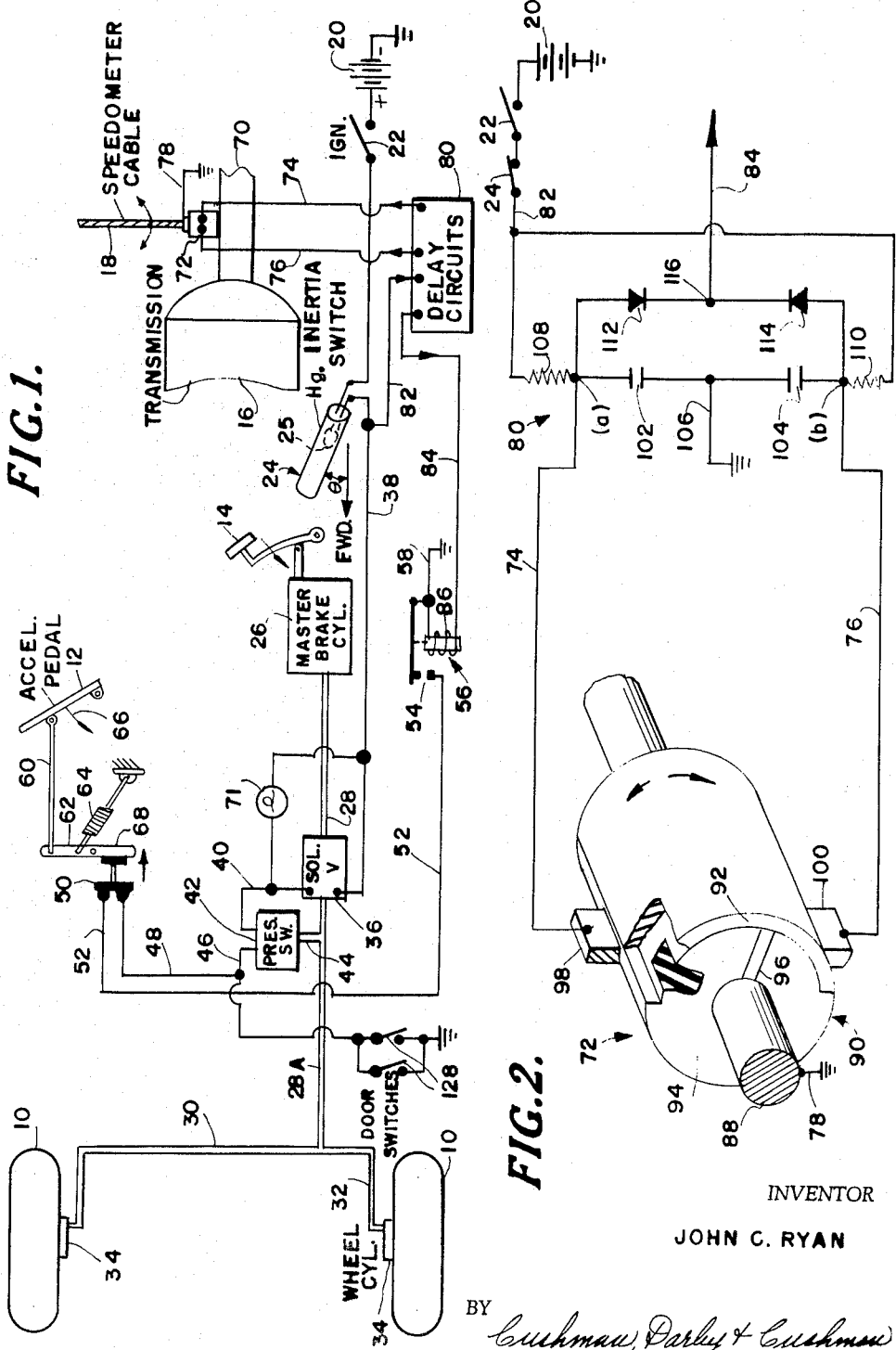
INVENTOR
JOHN C. RYAN
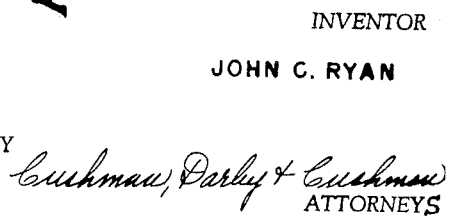
ATTORNEYS Feb. 1, 1966    J. C. RYAN    3,233,153
ELECTRICAL CONTROL CIRCUIT
Filed Oct. 26, 1962    3 Sheets-Sheet 2
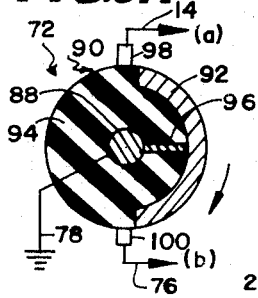
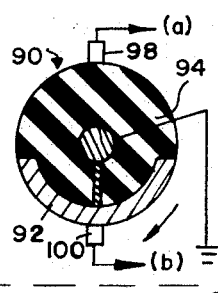
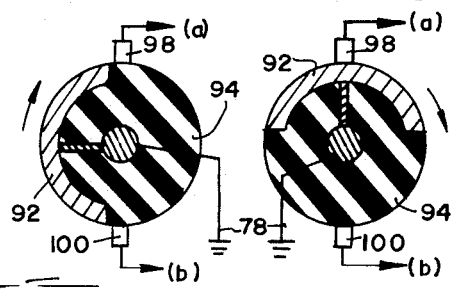
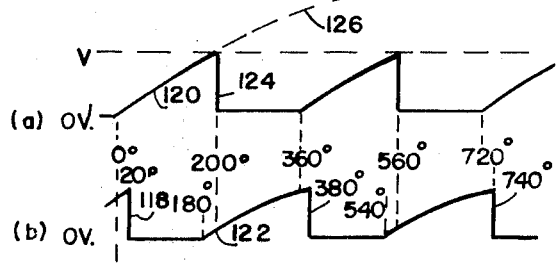
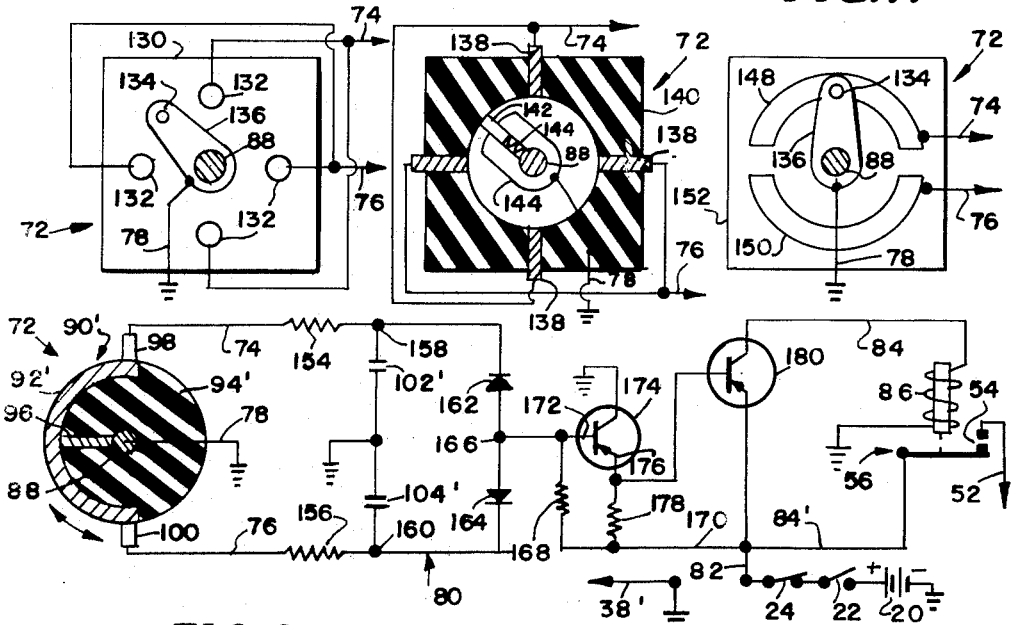
INVENTOR
JOHN C. RYAN
BY *Cushman, Darby & Cushman*
ATTORNEYS

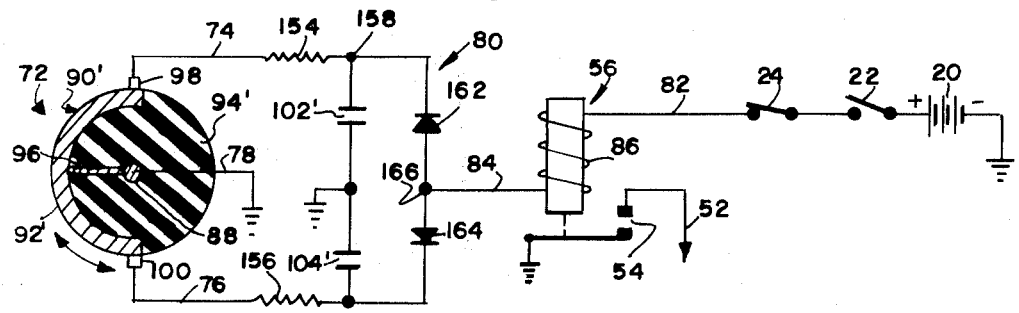
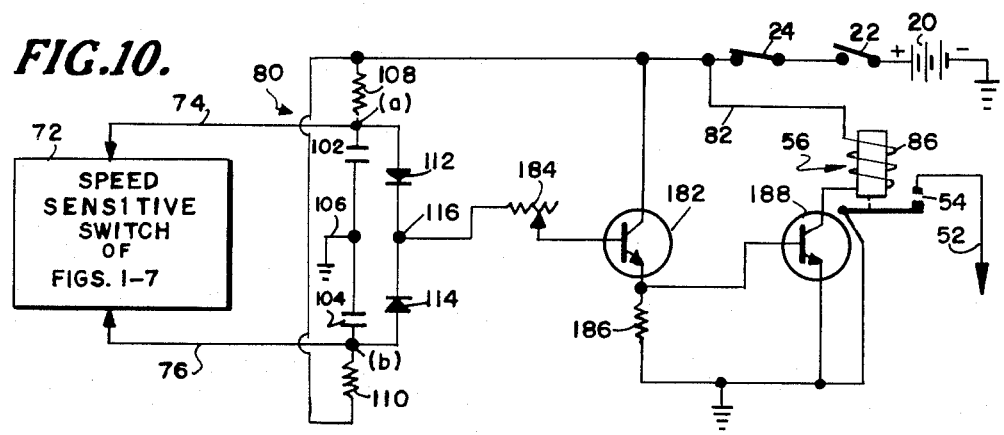
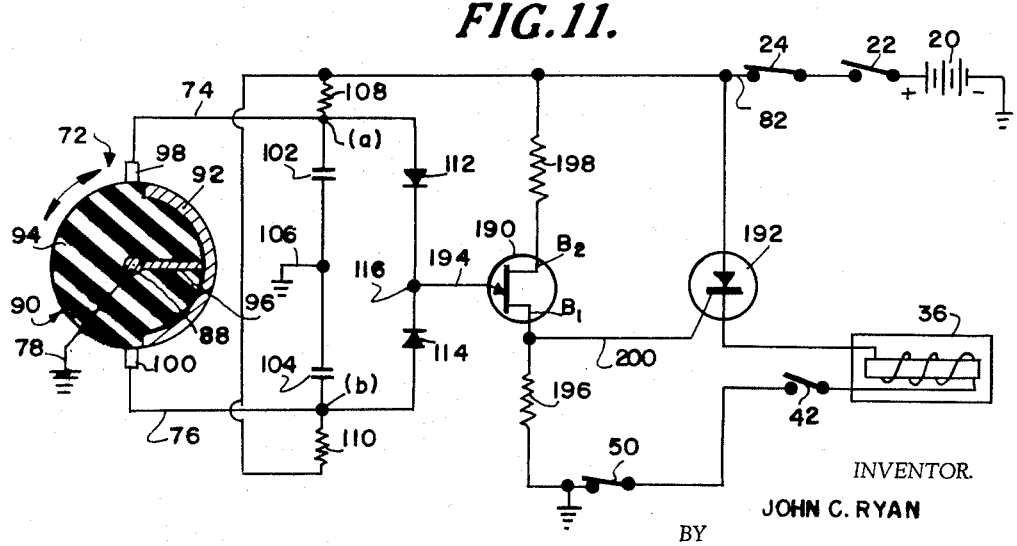

3,233,153
ELECTRICAL CONTROL CIRCUIT
John C. Ryan, Miami, Fla.
(4615 Le Jeune Road, Coral Gables, Fla.)
Filed Oct. 26, 1962, Ser. No. 233,217
20 Claims. (Cl. 317—148.5)

This invention relates to an electrical control circuit as well as to components thereof and to a system in which the circuit is especially useful.

The circuit is particularly adapted for utilization with any type of equipment which has a rotatable element that may be stopped in its rotation by any suitable means, for example, brakes, and means cooperable therewith by which cessation of rotation may be maintained for an indefinite period of time as long as certain conditions are continuously executed. More specifically, the invention may be utilized in a vehicle which has fluid operated brakes, to block the return flow of fluid and thereby lock the pressure on the fluid and consequently on the brakes, at the level to which it has been placed, by temporary operation of the foot brake, for example, after the acceleration pedal has been released to an idling position and the vehicle has come to a complete stop.

Brake holders of this general type are known, for example, in my prior Patent 2,966,565. In this present application, as well as in that patent, a solenoid operated check valve is interposed in the conduit between the master brake cylinder and the wheel cylinders of the hydraulic brake system. Whenever this valve is actuated so as to cause the fluid system to be closed, i.e., to prevent any change in level of the pressure in the system between the valve and wheel cylinders, that pressure level is maintained until the valve is released to return the fluid system to the control of the master brake cylinder.

In my prior patent, operation of the solenoid valve is effected, in a specific example, by utilizing two dashpot type fluid pressure operated motors for delay-closing a respective normally open switch in response only to the cessation of rotation of a driving member, for example, a speedometer cable drive. Except for the electrical switches which the dashpot plungers respectively operate, the control system for operating the dashpot plungers is fully mechanical in the embodiment specifically discussed in that patent, requiring use in that regard of positive or negative fluid pressure, for example vacuum, housingly channeled through rotatable fluid pressure valves. Though such a mechanical embodiment operates to give the results specified, it has too many parts, some of which require critical tolerances and complex assembly. Such a vacuum type system is subject to changes of altitude, and the dashpots are subject to both ambient and altitude changes. For example, going from below sea level desert conditions to high altitudes, such as mountain conditions, will affect the timing of the unit. This system requires too much technical know-how to install and maintain and is not as practical or durable as the electrical system of the present invention.

In this application, a source of electrical pressure or voltage, such as a battery, the potential of which stays sufficiently steady naturally or by regulation, e.g., automatic regulation as in an automobile, is utilized to effect the energizing or charging of a storage or delay means such as a pair of condensers, which are alternately charged and discharged out of phase with each other by a rotatable switch means that sequentially connects and disconnects each condenser to a reference potential while the rotary part of the switch is rotating. This rotary part of the switch is coupled in any desired manner to any rotatable element of the vehicle system the angular velocity of which element is related to the speed of the vehicle, for example, the drive shaft or alternatively the speedometer cable, and the switch is so arranged that regardless of the angular position at which the rotary part of the switch stops, at least one of the condensers is then, and only then, operated (charged or discharged according to the embodiment at hand) to effect operation of the solenoid brake holding valve. Several different embodiments of the rotary switch and control circuit associated therewith are presented.

It is, therefore, the primary object of this invention to provide an improved electrical control circuit of the type above indicated, to overcome the disadvantages of similar prior control systems of the mechanical or electrical type and to effect such a circuit in a control device which is easily regulatable in its time constants, reliable, simple and rugged in construction, and operable from a voltage source. Another object is to provide such a control device which is easy to install in the braking system of a motor vehicle without necessitating any major changes in the system, or in the driving habits of the operator of the vehicle, to effect an automatic holding operation by the brakes only after the vehicle has completely stopped and to prevent creeping or the like at such times. The device does not interfere with or hinder the general operation of the vehicle and is not noticeable in the operation of the vehicle in any way until the motion of the vehicle has completely stopped.

Other objects, features, and advantages of this invention will become apparent to those of ordinary skill in the art after reading the appended claims and the following detailed description in conjunction with the drawings, in which:

FIGURE 1 is a schematic and diagrammatic presentation of a vehicle system embodying the invention;

FIGURE 2 schematically illustrates one embodiment of the control circuitry;

FIGURES 3A–D diagrammatically represent successive steps in the operation of the switching element of FIGURE 2;

FIGURE 4 represents waveforms associated with the corresponding (a) and (b) points of FIGURES 2 and 3;

FIGURES 5, 6 and 7 illustrate three other embodiments of the switching element of FIGURE 2;

FIGURE 8 schematically and diagrammatically illustrates a still further embodiment of the invention;

FIGURE 9 illustrates a modification of FIGURE 8;

FIGURE 10 illustrates a modification of FIGURE 2; and

FIGURE 11 shows another embodiment of the invention eliminating an intermediate relay.

As above indicated, the detailed description proceeds relative to installation of the control circuit of this invention in a vehicle system, but it is to be appreciated that the circuit may be employed in any type of equipment wherein a given element needs to be operated when another element stops rotating.

In FIGURE 1 the schematic-diagrammatic representation illustrates a portion of a vehicle including a pair of wheels 10, accelerator pedal 12, a foot brake 14, transmission 16, speedometer cable 18, battery 20, and ignition switch 22. Though not shown, any conventional voltage regulating system may be used with battery 20 if desired. The vehicle is brakeable as with any brake system such as a fluid brake, for example, of the hydraulic type, which includes a master fluid motor or brake cylinder 26, conduit 28 which divides into two conduits 30 and 32 that respectively connect to the two conventional smaller fluid motors or wheel cylinders 34. In normal fashion, the amount of pressure exerted by wheel cylinder 34 to stop rotation of wheels 10 is regulated by the degree of depression of foot pedal 14, the greater the foot pressure the greater the fluid pressure.

Serially in either side of the battery circuit as in the positive line extending from ignition switch 22, is desirably connected a master switch 24 which may be manually operable, or preferably (either in addition to a manual master switch, or as illustrated, instead thereof) automatically operable by inertia such as the tilted, normally closed, mercury switch shown. This switch is forwardly inclined upwardly an angle $\theta$ set as required, for example 15° to 20°, and is preferably adjustable by means not shown to compensate for different road grades encountered in different sections of the country, so as to break the battery circuit only if the vehicle deceleration rate exceeds that generally occurring due to normal, as opposed for example to emergency, braking practices, by intertially forcing a mercury ball 25 uphill and thereby disconnecting the contacts within switch 24. This provides a foolproof safety system, as is made more apparent below once a greater understanding of the control system and its different modifications is obtained.

Inserted in fluid pressure line 28 is an electromatically operated valve device or brake holder 36, such as a solenoid valve which opens and closes line 28 to check the fluid flow therein.

Operation of solenoid valve 36 requires the concurrence of several conditions amongst which is the closure of ignition and master switches 22 and 24 in normal fashion. This provides current from battery 20 through these switches to line 38, and, therefore, to one side of the electro-magnetic coil (not shown) in solenoid valve 36. The other side thereof is connected by line 40 to a pressure operated switch 42. This switch remains open at all times except when the pressure in fluid conduit 28A, as sampled via conduit 44 on the discharge side of solenoid valve 36 increases to a sufficient amount to close switch 42, as for example, when the hydraulic brakes are applied and pressure attains the setting of the pressure switch 42. The other side of the pressure switch is connected by lines 46 and 48 to a normally open switch 50, and thence by line 52 to the normally open switch contacts 54 of relay 56 to the system reference potential, i.e., ground, by line 58. Tracing the circuit from ground through battery 20 and back to ground at line 58, it will be noted that solenoid valve 36 is energized whenever pressure switch 42, accelerator switch 50, and relay switch 54 are all closed. Switch 50 is associated with accelerator pedal 12 and is arranged by virtue of the throttle linkage 60, pivot lever 62 and spring 64, to be closed as illustrated when pedal 12 is released to effect an idling of the vehicle engine. Upon pivotal depression of accelerator pedal 12 in the counter-clockwise direction indicated by arrow 66, lever 62 is pivoted about point 68 in a counter-clockwise direction against the action of spring 64 so as to allow switch 50 to open and break electrical connection between lines 48 and 52. However, with the accelerator pedal in an idle position, switch 50 is closed, and it only remains to close the relay switch contacts 54 in order to energize solenoid valve 36. In other words, as usual in bringing a vehicle to a stopped condition, the accelerator pedal is released and the foot brake 14 applied to effect the fluid pressure condition necessary in conduit 28A to brake wheels 10 and halt the vehicle. In accordance with this invention, this foot braking also closes pressure switch 42, assuming an applied brake pedal pressure sufficient to cause the pressure in line 28A to exceed the preset minimum (say, a setting of approximately 110–125 p.s.i.) as required by pressure switch 42 to effect closure thereof.

It is at this time, and only then, when relay 56 can operate to cause its contacts 54 to close, for as will be apparent from the further discussion of this invention, no actuation of relay 56 can be effected until a vehicular rotatable element, such as a speedometer cable 18 or drive shaft 70 comes to a complete stop, indicating motion of the vehicle is halted.

If desired, a dashboard or like type indicator light 71 may be connected across the solenoid valve 36 to show when it is energized and the brakes are locked in.

As indicated in FIGURE 1, there is connected between drive shaft 70 and speedometer cable 18 a device 72 which has two input lines 74 and 76 and a ground line 78. These input lines are connected to delay circuits 80 which have a further input on line 82 from battery 20, and an output on line 84 to the coil 86 of relay 56. Briefly described, device 72 is a speed-sensitive switch which allows each of the delays in delay circuits 80 to be energized and de-energized by voltage from line 82, but to an insufficient degree to cause actuation of relay 56 until the vehicle, and consequently the rotary element thereof which is coupled to the switch, comes to a complete stop.

A specific embodiment of the speed sensitive switch and control circuit associated therewith is shown in FIGURE 2. The speed-senstive switch 72 includes a metallic shaft 88 which is rotatably secured in any desirable manner to a drum or similar cylinder 90. Shaft 88 is that which is coupled to a rotatable element of the vehicle system, for example, the speedometer cable 18 of FIGURE 1. Accordingly, drum 90 rotates with the same angular velocity as does that rotatable element, stopping when it stops and immediately rotating forwards or backwards when and as it rotates. As may be more readily apparent from FIGURE 3A, drum switch 90 has its rotor part made up of a conductive arcuate member 92, and an insulative or nonconductive member 94 with the conductive member 92 being electrically connected to shaft 88 in any convenient manner as by an insert 96. Shaft 88 and insert 92, as well as arcuate member 92, are metallic in nature, with at least the latter being preferably made of copper. The stator or stationary part of switch 90 includes two brushes 98 and 100, preferably disposed, as illustrated, 180° apart and in riding contact with the surface of the drum or rotatable element 90 of the speed-sensitive switch 72. It will be noted that the arcuate conductive element 92 of the drum switch; however, does not subtend as large an angle as do the brushes 98, 100. Any desired difference in angle subtended may be employed, and for purposes of explaining operation of the speed-sensitive switch and circuitry associated therewith, it will be assumed that conductive element 92 subtends an angle of 160°, no limitation thereto being intended, though for the particular embodiment in question the angle must be less than the minimum angle subtended by the brushes.

In FIGURE 2 it will be noted that brushes 98 and 100 are respectively connected to the lines 74 and 76 which, as previously indicated with reference to FIGURE 1, couple to the delay circuits 80. In FIGURE 2, the delay circuits include two condensers 102 and 104 which are connected together at one side and to the common reference potential, i.e., ground, by line 106. The other sides of these condensers are connected at respective junctions (a) and (b) to lines 74 and 76 respectively, and to respective charging impedances or resistors 108 and 110 which are in turn connected in parallel to line 82 extending from the ignition and master switches 22, 24 and battery 20. Also connected to these junctions are diodes 112 and 114 coupled together in opposite senses, for example, back-to-back, in a common forward direction towards junction 116 to which is connected the output line 84. In operation, it will become apparent that the diodes act as isolating means for preventing "sneak" currents or voltages associated with one condenser from affecting the other condenser, and their common connection effects a logical Or circuit by which a signal is produced on output line 84 corresponding to the state of charge of the higher charged condenser 102, 104, notwithstanding whether that other condenser is being charged or discharged.

To aid in understanding the operation of the circuit of FIGURE 2, details are now given in reference to FIGURES 3 and 4 of a clockwise operating mode of drum switch 90, representing for example forward movement of the vehicle, but it is to be understood that the same details are illustrative for counterclockwise operating modes and reverse movements or mixture of opposite direction rotations of switch 90. In FIGURE 4, waveform (a) represents the voltage across condenser 102, i.e., the voltage between line 74 and ground as present at junction (a); while waveform (b) of FIGURE 4 similarly refers to the voltage at junction (b) of FIGURE 2 which is the same as the voltage across condenser 104 and between line 76 and ground. The voltage waveforms in FIGURE 4 are based on the above assumption that the conductive arcuate member 96 of the rotary switch subtends an angle of 160°, while brushes 98 and 94 subtend a 180° angle. In the position of drum 90 in FIGURE 3A, neither of the brushes is in contact with the conductive element 92, but each is disconnected from ground 78 by the insulative material 94. This instant of time, which may be considered, for example, 10° clockwise, finds both condensers being charged, condenser 102 being very little charged by this time since brush 98 was just released from the grounded conductor 92, with condenser 104 being considerably more charged as shown in waveform (b) of FIGURE 4 at about 10° because a considerable angle of rotation has passed since it began to be recharged. As soon as grounded conductor 92 comes under brush 100, however, condenser 104 is discharged as indicated by drop 118 in waveform (b). As the rotary element 90 of the switch continues its colckwise rotation through the FIGURE 3B position, brush 98 remains ungrounded, so condenser 102 continues to charge, as indicated by the solid line 120 in waveform (a). At a point of 180° in its counter-clockwise rotation, the conductive element 92 leaves brush 100 to disconnect junction (b) from ground and allow condenser 104 to start charging due to current via resistor 110, as on a path indicated by line 122 in waveform (b). The next step is for conductive element 92 of the switch to come under brush 98 again, and this occurs 20° later than when it left brush 100 (in keeping with the example cited), so as to discharge condenser 102 as indicated by the drop 124 in waveform (a) at 200°. Consequently, condenser 102 remains discharged during the step illustrated in FIGURE 3D during which time condenser 104 continues to charge along line 122, with further clockwise rotation of the grounded conducting element 92 to the extent of moving out from under brush 98 again at the 360° point causing condenser 102 to start charging again.

In other words, as long as the rotary element or drum 90 with its grounded conductive element 92, is rotating, the condensers will each be alternately charged and discharged, and it will be noted by reference to FIGURE 4 that the charging of one condenser, for example, condenser 102 between the 0° and 200° times fully embraces the discharging time of the other condenser between 20° and 180°. Moreover, the reverse is true, i.e., that charging of condenser 104, for example, from 180° to 380° fully timewise embraces the discharging period of condenser 102 from the 200° point to the 360° point. As indicated in FIGURE 4, condenser 102 to which waveform (a) pertains, is allowed to charge only to a given voltage V before it is discharged. This is also true of condenser 104, but of course, it is true for either condenser only when the rotary element is moving at a given speed, with the amount of voltage to which the condensers are charged being inversely related to the speed or angular velocity of the rotary element of the switch. However, it is an important feature of this invention that neither condensor 102 or 104, regardless of how slowly the rotary element of the switch rotates, can be charged to a sufficient degree to effect actuation of relay 56 in FIGURE 1 as long as there is any movement whatsoever of that rotary switch element 90. Taking as an example the requirement that to actuate relay 56, i.e., to cause its switch contacts 54 to close, requries a voltage of 2V, condenser 102, as well as condenser 104, is not allowed to charge to the voltage 2V unless the rotary element of switch 72 completely stops and stays stopped for at least a short period of time, for example, two seconds. When it does, however, the condenser that is then being charged charges to and beyond this voltage, as indicated by dash line 126 in FIGURE 4, to cause actuation of relay 56 and consequent closure of its contacts 54 whereupon solenoid valve 36 is energized assuming the accelerator pedal switch 50 is closed. As above indicated, this locks the high pressure of the brake fluid previously effected by depression of foot brake 14, to hold the vehicle in its stopped position, even if brake pedal 14 is released. However, subsequent depression of accelerator pedal 12 to cause either forward or reverse vehicular movement immediately opens switch 50, thereby breaking the energizing circuit of solenoid 36 and reopening conduit 28 to the flow of fluid therein. Since switch shaft 88 begins rotating with movement of the vehicle in either direction, the prior relay energizing signal that was on line 84 immediately ceases because both condensers quickly get discharged and go back to the FIGURE 4 type operation. This precludes reenergization of solenoid valve 36 even if the accelerator pedal is momentarily released again unless, of course, the brake pedal is again depressed and the vehicle halted.

For further safety purposes, a switch may be utilized in connection with each door on the car to cause the solenoid valve 36 to remain operated as long as any door is open. Such door switches, which may be similar to the conventional door-operated dome light switches, are indicated by numerals 128 in FIGURE 1, and it will be noted that these bypass the accelerator switch 50 so that even if accelerator pedal 12 is depressed to open switch 50, no deenergization of solenoid valve 36 will be effected until all of the door switches 128 are reopened by the closing of their respective doors. Though door switches 128 are shown connected to ground and thereby bypassing relay switch contacts 54, as well as accelerator switch 50, it will be appreciated that they may be connected directly across lines 48 and 52 in order that the speed sensitive switch and associated control circuit above described in connection with FIGURE 2 may continue to be operative, if such is desired. Alternatively, the door switches may be connected between line 40 and ground if it is desired to operate solenoid valve 36 by the opening of a door regardless of the condition of switches 42, 50 and 54.

It will be appreciated that the number of door switches, as well as the number of wheel cylinders may be increased or decreased as desired.

Other embodiments of the speed sensitive switch 72 are shown in FIGURES 5, 6 and 7, with each showing the elements thereof that are connected to the input lines 74, 76, and the ground lines 78. In FIGURE 5, the stationary part of the switch includes insulative or nonconductive material 130 in which is set or otherwise disposed with flush surfaces a set of four contacts 132, arranged at equal angular positions around a circle which is concentric with shaft 88 and common to brush 134 carried by the rotatable element 136. It will be noted that diametrically opposite contacts are connected together to the same output line 74 or 76.

FIGURE 6 shows an embodiment similar in operation to FIGURE 5, but instead of contacts being set in the face of insulative material, brushes 138 extend through equally angularly disposed apertures in an insulative or nonconductive block of material 140 to an aperture therein against the surface of which is pressed a brush 142. This latter brush is carried by rotatable element 144 and pressed outwardly by spring 146. Shaft 88 causes element 144 and brush 142 to rotate and sequentially connect the stationary contacts or brushes 138 to ground. Since opposite contacts 138 are connected together, lines 74 and 76 are alternately connected to ground.

The embodiment of switch 72 illustrated in FIGURE 7 is, like that in FIGURE 5, a disc type with a brush 134 being carried by grounded element 136 and rotated by shaft 88. Instead of the stationary contacts being of only slight angular extent as are contacts 132 in FIGURE 5, the stationary contacts 148 and 150 in FIGURE 7 are arcs that subtend an angle less than 180°, for example, 160° (in keeping with the FIGURE 2 example), and these arcs are nonoverlappingly on the same circumference. They, of course, are of metal, perferably copper, and are set in the nonconductive or insulative block of material 152, preferably with surfaces flush. In operation, brush 134 connects line 74 to ground for the duration of its rotation only over the arcuate contact 148, and disconnects that line from ground for the remainder of the cycle. In like manner, line 76 is connected to ground while brush 134 contacts the arcuate contact 150, but not during the remainder of the cycle.

Operation of the speed-sensitive switches of FIGURES 5, 6 and 7, in relation to the delay circuits previously described is similar to that discussed relative to FIGURES 2–4, it being understood that because of the dual pairs of stationary contacts in FIGURES 5 and 6, the periodicity of the system is double. This permits shaft 88 to be rotated at a slower rate and still retain the same time delay feature. Slower shaft rates yet can be obtained by adding more paired contacts. It will, of course, be appreciated that either or both the charging resistors and condensers of FIGURE 2 may be adjustable to effect any delay desired in any case.

A still further embodiment shown in FIGURE 8 illustrates another modification of the speed-sensitive switch 72, as well as a different embodiment of the delay circuits 80. In this case, the rotary element 90' has a larger percentage of its surface made of conductive material 92', than of nonconductive or insulative material 94', with the conductive material 92' still being connected to shaft 88 by conductive insert 96, accordingly to ground via line 78. In keeping with the example above set, it will be assumed that the amount of conductive and nonconductive materials exchanged is such to cause the conductive material 92' to subtend an arc greater than the maximum arc between brushes 98 and 100, i.e., substantially more than 180°, for example, 200°, while the surface arc subtended by nonconductive material 94' is then 160°.

The delay circuits in the FIGURE 8 modification include condensers 102' and 104' while lines 74 and 76, which respectively couple those condensers to the brushes 98 and 100, include respective impedance discharging means such as resistors 154 and 156. Connected to junctions 158 and 160 are oppositely polarized diodes 162 and 164 to the junction 166 between which is connected a condenser charging impedance such as resistor 168. The other end of this charging resistor is connected by line 170 to the aforementioned power line 82 from the ignition and master switches 22, 24, which are in turn coupled to storage battery 20. Also connected to junction 166 is the base 172 of a transistor 174, the collector of which is grounded and the emitter 176 of which is coupled to the voltage supply line 170 by a resistor 178. It will be appreciated, therefore, that transistor 174 is connected in an emitter-follower configuration. The emitter output of this transistor is connected to the base input of a second transistor 180, which is connected in an amplifying configuration, so that its output as applied to the coil 86 of relay 56 is sufficient to actuate the relay and close its switch contacts 54, thereby providing an output signal on line 52 to operate the solenoid valve 36 (FIGURE 1) as before explained when all other requisites are met. In FIGURE 8, it should be noted that the armature of relay 56 is connected to battery + via lines 82 and 84', while line 38' is grounded. This is the reverse of the FIGURES 1–2 embodiment in this respect, but it is to be understood that either mode of connection may be utilized in either the FIGURES 1–2, FIGURE 8, or other embodiments of this invention.

In operation, the arrangement in FIGURE 8 is such that when shaft 88 of the speed-sensitive switch is at standstill, at least one of the brushes 98, 100 is connected to ground through line 78, thereby discharging the associated condensers through its respective resistor 154, 156. In effecting this discharge, the voltage on the condenser being discharged gradually reduces to the point where it is no more positive than the voltage at junction 158 (or 160 if condenser 104' is involved) than that which is present thereat due to the voltage division effected by resistors 168 and 154. In other words, when the condenser that is being discharged, discharges sufficiently that the charging resistor 168 supplies current to the circuit, then a given voltage drop is finally present across resistor 168. This drop is sufficient then to lower the voltage on base 172 below that of emitter 176 sufficiently to cause conduction of transistor 174, which in turn causes conduction of transistor 180 and operation of relay 56.

On the other hand, as soon as the rotative element 90' of the switch in FIGURE 8 begins to rotate, in either direction, condensers 102' and 104' will each be alternately charged and discharged. The charging will take place through a single charging resistor 168, but the discharging takes place due to the respective discharging resistors 154 and 156 as they are connected to ground by the conductive element 92'. The discharge time constant associated with the condensers (both preferably being the same) is substantially less than the charging time thereof due to a substantial difference in the values of charging resistor 168 and discharging resistors 154, 156. These time constants are made to be of such relative values that under no circumstances will relay 56 be actuated to cause closure of its switch contacts 54 unless the speed-sensitive switch 72 senses non-rotation of the rotative element driving its shaft 88.

The transistor portion of FIGURE 8 need not be employed if desired, giving rise to a circuit like that in FIGURE 9, in which relay 56 is of the sensitive type with its coil 86 showing 10,000 ohms resistance for example, as opposed to a standard 12 volt relay having a coil resistance of 100 to 300 ohms as is usable in FIGURE 8. As exemplary, condensers 102' and 104' may both have values of 100 mfd. in FIGURE 8 and 250 mfd. in FIGURE 9, no limitation being intended. Of course, these condensers and/or resistors 154 and 156 in either circuit may be varied to obtain the timing desired. Operation of the FIGURE 9 circuit is similar to that already explained for the transistorized version in FIGURE 8.

In a manner similar to the way the embodiment of FIGURE 9 can be transistorized as per FIGURE 8, the embodiment of FIGURE 2 may also be transistorized as illustrated in FIGURE 10. In this latter figure, the speed sensitive switch 72 may be of any of the types illustrated in FIGURES 2–7 and heretofore indicated as utilizable with the described delay circuits 80. With the delay circuits being connected in the configuration shown in FIGURE 10, the output line from junction 116, which as above mentioned form a logical Or circuit, is applied to the base of a transistor 182, preferably through a rheostat 184. Transistor 182 is connected in an emitter follower configuration with its collector being connected directly to the positive potential on line 82, and with its emitter being connected to ground through a resistor 186. Its emitter is also directly coupled to the base of a second and amplifying transistor 188 the emitter of which is grounded and the collector of which provides an output on line 84 to one end of relay coil 86 the other end of which is connected to line 82. This coil is a part of relay 56 previously referred to in connection with FIGURES 1, 8 and 9. Whereas relay 56, when connected directly to diode junction 116 needs to be of a more sensitive type with its coil having a resistance of approximately 10,000 ohms for example, in the transistorized FIGURE 10 version the relay coil may be in the 100 to 300 ohm range as in a standard 12 volt relay for example.

As is apparent from FIGURE 10, transistors 182 and 188 are of the NPN type, instead of the PNP type utilized in the FIGURE 8 embodiment. In FIGURE 10, as exemplary, the emitter resistor may have a 2,200 ohm value, while rheostat 184 is of 10,000 to 15,000 ohms to give a timing range control of about 5 seconds when resistors 108 and 110 are approximately 56,000 ohms and condensers 102 and 104 are approximately 100 mfd. Rheostat 184 is optional, and of course variation in the time delay factors may be obtained by varying either the resistors 108, 110 or the condensers 102, 104. Though FIGURE 10 illustrates the armature of relay 56 as being connected to ground, it instead could be connected directly to line 82, in which case line 38 of FIGURE 1 would be grounded and disconnected from line 82 and the master switch 24.

In all of the embodiments referred to so far, use of an intermediate or intervening electromagnetic relay such as relay 56 between the diode junction 116 and solenoid valve 36 has been suggested, but it will be appreciated that such is only desirable if the voltage deliverable to solenoid valve 36 is insufficient in the absence of relay 56 to energize the solenoid valve 36. FIGURE 11 illustrates a modification of the FIGURE 10 circuit for example, which fully eliminates any necessity for any intermediate or intervening electromagnetic relay 56. This is accomplished by employing a unijunction transistor 190 and a controlled rectifier 192 of the silicon type for example. Diode junction 116 is connected by line 194 to the emitter electrode of unijunction transistor 190, while its lower or $B_1$ base electrode is connected to ground via a resistor 196, and its upper base electrode $B_2$ is coupled to the positive potential on line 82 by a resistor 198. The $B_1$ base is also connected directly by line 200 to the control electrode or gate of rectifier 192 the anode of which is connected to the positive voltage on line 82 and the cathode of which is connected directly to the coil of solenoid valve 36.

In operation, after the voltage at one or the other or both RC junctions in FIGURE 11 builds up following the cessation of rotation by switch rotor 90 as previously described in relation to FIGURE 2, the resultant signal passes through the corresponding diode to line 194 causing firing of unijunction transistor 190 when the necessary emitter level (approximately 2 volts, for example) is reached. This causes the charged condenser 102, 104 to discharge and cut off transistor 190 again. A sawtooth signal is therefore applied to its emitter causing alternate conduction and non-conduction of current between bases $B_2$ and $B_1$ of the transistor and a resultant sawtooth voltage across resistor 196. This latter voltage, when it first reaches the vicinity of, say, 0.03 volt or more, applies via line 200 a gating-on signal to the silicon controlled rectifier 192, causing or allowing sufficient current to flow from battery through the rectifier itself to the coil of solenoid valve 36 to energize and actuate the valve. Since a silicon controlled rectifier acts much like a thyratron, once rectifier 192 is gated on it stays conducting, until one of the switches 22, 24, 42 or 50 is opened, regardless of the sawtooth fluctuations on line 200. Since re-rotation of rotor 90 of the speed sensitive switch 72 will not cause the rectifier to be turned off so as to release the brake holding solenoid valve 36, it is quite desirable to employ the inertia safety switch 24 of FIGURE 1 because any condition which would lock the wheels (such as a panic stop) would create enough inertia for the inertia switch to prevent the rectifier circuit from being energized or immediately turn it off if it had been energized.

Exemplary, non-limiting parameters for FIGURE 11 are 100 mfd. for condensers 102 and 104, 100,000 ohms for resistors 108 and 110, 27 ohms for resistor 196, and 330 ohms for resistor 198. Of course, these values may be varied as desired to obtain the particular operation required under any given set of operating circumstances.

It has been shown that any one of several different types of semi-conductors may be utilized as part of this invention, and the inventive concept is generic to the inclusion of none as well as one or any larger number of semi-conductive type components of any nature. The uninjunction transistor and controlled silicon rectifier combination of FIGURE 11, though it eliminates any necessity for an intermediate relay, is extremely expensive at the present time in comparison to regular transistors, but such a combination has been successfully operated, as have other embodiments herein disclosed. FIGURE 11 represents preferred circuitry because it is relatively insensitive to voltage and ambient temperature changes while being capable of handling more than enough current to operate the solenoid valve without requiring an intervening relay. The circuitary of FIGURE 11 can be assembled in a much smaller package than relay circuits and life expectancy is far greater.

All of the embodiments of this invention as incorporated in a vehicle preferably include the inertia switch 24 (FIGURE 1), pressure switch 42, and one or more door switches 128, for these are safety features which go to make the overall system fully foolproof. The inertia switch operates to prevent unintended or inadvertent lockup of the brake system such as might occur because of (1) emergency or "panic" stops or skids, (2) malfunctioning of the system due to failure of electrical components such as shorted transistors, relays, or open leads, (3) malfunctioning of the speed sensitive switch drive such as might occur from a broken speedometer cable or stripped gears, or (4) inadvertent door openings or malfunction of door safety switches or leads. In addition, the fool-proof safety inertia switch allows a vehicle so equipped to qualify for safety approval by proper safety associations or safety engineers.

The pressure switch 42 is used to aid the driver when making short stops as in traffic and while parking the vehicle. This switch prevents the brake holding system from energizing before the brakes have been applied in case of malfunctioning of the system, and prevents unnecessary energizing of solenoid valve 36 when its use is not required since it established a minimum brake pedal pressure below which the brake holding system will not operate.

It is therefore apparent that this invention provides many advantages over previous systems of this general nature. For example, the control system, since it is electrical or electronic in nature, lends itself quite readily to miniaturization, while tolerances of components in the system are not critical. Because the delay circuits require only a low amount of current, the switches and components in the control system have a longer life expectancy and reliability factor than prior art systems. The control system, considered as a unit or its components separately, is not restricted to a specific location in its mounting on a vehicle, nor restricted to certain positions or angles (with the exception of the inertia switch) as prevalent in prior art devices. Furthermore, neither altitude nor temperature variations affect the instant control system. In addition, the speed sensitive switch rotation may be either clockwise or counter-clockwise, and since it is of a concentric type, fluctuations of the speedometer cable or other drive are not effected as they would be by a cam operated switch. Moreover, as opposed to other systems, the control system of this invention in its more exhaustive aspects includes safety features not to be found in any other system.

Of course, though the negative terminal of battery 20 has been described as grounded, the positive terminal instead may be grounded as is the case in many vehicles but then no changes need be made in the circuitry except where reversal of the connections to the semiconductors, or reversal of the conductivity type thereof, is desirable for proper polarity considerations, as well understood in the art.

Thus, it is apparent there has been disclosed apparatus which successfully accomplishes all the objects and has all the features and advantages appertaining to this invention. Further embodiments and modifications of this invention will become apparent to those of ordinary skill in the art after reading this disclosure, but is to be appreciated the disclosure herein is intended to be exemplary and not limiting, the scope of the invention being defined by the appended claims.

What is claimed is:
1. A control circuit comprising:
   (a) electrical delay means,
   (b) electrical circuit means for cyclically energizing and de-energizing said delay means including switch means and two electrical lines coupling the switch means to said delay means,
   (c) said switch means having a stationary part and a rotor part with the stationary part including at least two stationary contacts separated a given angle and respectively connected to said lines to effect the aforesaid line to switch means coupling,
   (d) said rotor part having a rotatable contact to contact said stationary contacts at least during rotation of said rotor part to effect connection thereof to a reference potential,
   (e) one of said stationary and rotor parts having a portion made of insulative material and a portion including each said contact therefor made of conductive material circumferentially proportioned relative to the said insulative material
      (1) to cause each of said stationary contacts and their respective lines to be cyclically connected and disconnected to said reference potential for different lengths of time while said rotor part is rotating at any speed to effect the cyclic energization and de-energization aforesaid and
      (2) to cause the cycles relative to the respective lines to be out of phase with each other sufficiently that one of the energizing and de-energizing portions of the cycles for either line timewise fully embraces the other portion for the cycles of the other line as long as the rotor part is rotating at all so that when the rotor part stops the existing embracing cyclic portion can continue to exist whereby then and only then the said circuit means operates the said delay means in a manner different than when the said rotor part is rotating.

2. A control circuit as in claim 1 wherein said electrical delay means includes two condensers connected at a common junction to said reference potential and otherwise respectively to said two lines, and means coupled to said two lines for isolating the respective signals of said condensers from each other.

3. A control circuit as in claim 2 wherein said isolating means includes two diodes serially connected in opposite senses across said condensers between said lines.

4. A control circuit as in claim 3 including an electromagnetically operated device and two transistors connected in tandem between that device and the junction of said diodes for operating the said device in accordance with the signal at said junction, the first of said transistors being electrically connected to said junction in an emitter-follower configuration, the second of said transistors being coupled to the output of the said first transistor in an amplifier configuration.

5. A control circuit as in claim 4 wherein the conductive material subtends the said larger surface angle, said lines including a respective condenser discharging impedance, there being coupled between the said diode junction and a source of voltage a condenser charging impedance having a time constant with each of the condensers that is short relative to the discharge time constants therefor as effected by said discharge impedances, said charging impedance being connected at the said source end thereof to the said emitter of the first transistor, whereby only when said rotor part stops does either one of said condensers become discharged sufficiently to allow a voltage drop of sufficient duration and amplitude to appear across said charging impedance to effect sufficient conduction of said first transistor to actuate said electromagnetic device.

6. A control circuit as in claim 1 wherein said two stationary contacts of said stationary part are respective brushes circumferentially disposed said given angle apart, said rotor part being a rotatable drum-like element having a surface cooperating with said brushes, said surface being comprised of said conductive and insulative materials sequentially disposed circumferentially with one of said materials subtending an angle larger than the said given angle between said brushes.

7. A control circuit as in claim 6 wherein said conductive material subtends said larger angle so that at least one if not both of said lines is invariably connected to said reference potential when said rotor part is not rotating.

8. A control circuit as in claim 6 wherein the said insulative material subtends said larger angle so that at least one if not both of said lines is invariably disconnected from said reference potential when said rotor part is not rotating.

9. A control circuit as in claim 8 wherein the said electrical delay means includes two condensers connected together on one side to said reference potential and at their other sides respectively to the said two lines whereby said condensers are alternately discharged by the said conductive surface material of the rotor part while it is rotating, there being respective impedance charging means coupled to said condensers for charging same during times when the respective condenser is disconnected from said reference potential by the associated brush of the said switch means, and means coupled to the said condensers for electrically isolating same and providing an output signal related to the degree of charge of the higher charged condenser.

10. A control circuit as in claim 1 wherein said stationary part of the switch means includes a plurality of stationary contacts equi-distantly disposed on a circular path common to said rotatable contact, alternate ones of said stationary contacts being connected to different ones of said two lines, said delay means including two condensers respectively connected to said two lines on one side and to said reference potential on their one side, there being impedance means coupled to said condensers for effecting a charging thereof respectively during times when said rotatable contact disconnects the condenser in question from said reference potential, contact between said rotatable contact and one of said stationary contacts being operative to effect discharge of the associated condenser, the arrangement being such that when said rotor part is not rotating, at least one, if not both, of said condensers is being charged.

11. A control circuit as in claim 10 and further including diode means for isolating said condensers and effecting a logical Or circuit for providing a signat at all times proportional to the state of charge of the higher charged condenser.

12. A control circuit as in claim 10 wherein each of said two stationary contacts is arcuate and subtends a different part of a common circle to an extent substantially less than 180° whereby as to either one of said lines said rotatable contact causes disconnection thereof to said reference potential for a time greater than 180°.

13. A circuit as in claim 1 and further including an electromagnetically operated device coupled to the output of said delay means to be operated thereby only when said rotor part stops rotating.

14. A circuit as in claim 13 including amplifying means coupling said delay means to said device.

15. A circuit as in claim 13 including semiconductor means coupling said delay means to said device.

16. A circuit as in claim 15 wherein said semiconductor means includes switching means for at least energizing said device in response to an output from said delay means.

17. A circuit as in claim 15 wherein said semiconductor means includes two tandemly connected semiconductors the first of which has at least one base electrode and an emitter electrode and the second of which has two output electrodes and a control electrode, one of the said first semiconductor electrodes being connected to said delay means and the other to said control electrode of the said second semiconductor, the said two output electrodes being serially connected with said device for passing current thereto when gated on by a proper signal from said first semiconductor to said control electrode.

18. A circuit as in claim 17 wherein said first and second semiconductors are respectively a transistor and a controlled rectifier.

19. A circuit as in claim 18 wherein said transistor is a unijunction transistor and said rectifier is a silicon rectifier.

20. A circuit as in claim 17 wherein said first and second semiconductors are respectively a first transistor connected as an emitter follower and a second transistor connected as an amplifier.

References Cited by the Examiner

UNITED STATES PATENTS

| | | | |
|---|---|---|---|
| 1,506,957 | 9/1924 | Toquet | 200—26 |
| 2,152,084 | 3/1939 | Paine | 303—6.1 |
| 2,414,409 | 1/1947 | Goepfrich | 188—152.15 X |
| 2,462,655 | 2/1949 | McHenry | 200—26 X |
| 2,594,155 | 4/1952 | Guernsey et al. | 188—152.15 |
| 2,649,559 | 8/1953 | Wargo | 200—26 X |
| 2,701,035 | 2/1955 | Leichsenring | 188—152.15 |
| 2,734,590 | 2/1956 | Hays | 180—82.2 |
| 2,866,511 | 12/1958 | Niederoest | 180—82.2 |
| 2,876,856 | 3/1959 | Greene | 180—82.2 |
| 2,885,622 | 5/1959 | Plice et al. | 320—1 |
| 2,905,775 | 9/1959 | Rugeris | 200—26 |
| 2,927,474 | 3/1960 | Peras | 317—141 |
| 2,927,668 | 3/1960 | Price | 317—141 X |
| 2,966,565 | 12/1960 | Ryan | 200—82 |
| 2,972,112 | 2/1961 | Langan | 320—1 X |
| 3,010,053 | 11/1961 | Schubert | 317—148.5 |
| 3,017,543 | 1/1962 | Hillman et al. | 317—148.5 |
| 3,045,150 | 7/1962 | Mann | 317—148.5 |
| 3,054,479 | 9/1962 | Allen | 188—152.15 |
| 3,060,350 | 10/1962 | Rywak | 317—148.5 |

SAMUEL BERNSTEIN, *Primary Examiner.*

G. HARRY LEVY, *Examiner.*

E. E. PORTER, L. T. HIX, *Assistant Examiners.*